United States Patent
Bae et al.

(10) Patent No.: US 7,352,724 B2
(45) Date of Patent: Apr. 1, 2008

(54) APPARATUS AND METHOD FOR TRANSMITTING PACKET DATA IN A HIGH-SPEED PACKET TRANSMITTING MOBILE COMMUNICATION SYSTEM

(75) Inventors: Sang-Min Bae, Kyonggi-do (KR); Seong-Woo Ahn, Yongin-shi (KR); Jong-Han Kim, Yongin-shi (KR); Seo-Won Heo, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 981 days.

(21) Appl. No.: 10/425,932

(22) Filed: Apr. 30, 2003

(65) Prior Publication Data

US 2003/0202502 A1 Oct. 30, 2003

(30) Foreign Application Priority Data

Apr. 30, 2002 (KR) ...................... 10-2002-0023846

(51) Int. Cl.
*H04B 7/216* (2006.01)
(52) U.S. Cl. ...................................... 370/335; 370/342

(58) Field of Classification Search ................ 370/311, 370/314, 328, 329, 335, 337, 347, 442, 332, 370/468, 465, 342; 455/452.2
See application file for complete search history.

(56) References Cited

U.S. PATENT DOCUMENTS

| 5,453,987 A * | 9/1995 | Tran ........................... 370/447 |
| 7,054,298 B1 * | 5/2006 | Kim et al. ................... 370/342 |
| 2004/0066772 A1 * | 4/2004 | Moon et al. ................ 370/342 |

* cited by examiner

*Primary Examiner*—Chau Nguyen
*Assistant Examiner*—Hicham B Foud
(74) *Attorney, Agent, or Firm*—Roylance, Abrams, Berdo & Goodman, L.L.P.

(57) ABSTRACT

An apparatus and method for transmitting packet data in a high-speed packet transmitting mobile communication system. In the packet data transmitting apparatus, a packet data channel generator processes packet data to be transmitted on a packet data channel, a preamble signal generator transmits a preamble signal according to a gain of the packet data channel, a select signal generator generates a select signal to transmit the preamble signal a predetermined time before transmitting the packet data, and a multiplexer outputs the preamble signal upon receipt of the select signal and the packet data in time division when the select signal is not received.

11 Claims, 9 Drawing Sheets

APPARATUS AND METHOD FOR TRANSMITTING PACKET DATA IN A HIGH-SPEED PACKET TRANSMITTING MOBILE COMMUNICATION SYSTEM

PRIORITY

This application claims priority under 35 U.S.C. §119 to an application entitled "Apparatus and Method for Transmitting Packet Data in a High-Speed Packet Transmitting Mobile Communication System" filed in the Korean Intellectual Property Office on Apr. 30, 2002 and assigned Serial No. 2002-23846, the contents of which are herein incorporated by reference.

BACKGROUND OF THE INVENTION

1. Field of the Invention

The present invention relates generally to an apparatus and method for controlling forward link power in a mobile communication system, and in particular, to an apparatus and method for controlling forward link power in a high-speed packet transmitting mobile communication system.

2. Description of the Related Art

In general, a high-speed packet transmitting mobile communication system supports data channels only or both data channels and voice channels. The former system type is an IMT-2000 (International Mobile Telecommunication-2000) 1xEV-DO (Evolution-Data Only) and the latter system type is an IMT-2000 1xEV-DV (Evolution-Data and Voice).

In these high-speed packet transmitting systems, a plurality of users share the same packet data channel in TDM (Time Division Multiplexing), for high-speed data transmission. A base station (BS) receives feedback information concerning a forward channel status from a mobile station (MS). If the forward channel status is good, the BS transmits data using a high-order modulation scheme such as 8-PSK (Phase Shift Keying), 16-QAM (Quadrature Amplitude Modulation), or 64-QAM. Since a forward packet data channel is shared in TDM among a plurality of users, the BS assigns all available power to a single user for the time assigned to the user.

In view of the burstiness of packet data, there are periods where packet data is not being transmitted. In other words, packet data is discontinuously transmitted. Therefore, when a small number of users share a packet data channel or packet data delay results in repeated discontinuous packet data transmission, it is possible that an automatic gain controller (AGC) used for maintaining a constant received signal power cannot keep up with the power change of the packet data channel in the MS. As a result, the reception quality of the packet data channel is degraded if a high-order modulation scheme such as 16-QAM is used. This will be described with reference to FIGS. 1 and 2.

FIG. 1 is a block diagram of a conventional AGC for maintaining a constant received signal power and FIG. 2 is a timing diagram illustrating transmission power variations in a transmitter and received signal power variations in a receiver when a packet data channel is discontinuously transmitted.

Referring to FIG. 1, a gain control amplifier (GCA) 10 amplifies a signal S(t) received through an antenna (not shown) according to a feedback signal. The amplified signal is output and simultaneously provided to an accumulator 20. The accumulator 20 accumulates the received signal for a predetermined time. An adder 30 adds a negative-signed reference signal voltage—AIM_AMP to the output of the accumulator 20. That is, the adder 30 obtains the difference between the output of the accumulator and the reference signal voltage-AIM_AMP. A feedback loop filter 40 having a predetermined bandwidth filters the difference signal and the GCA 10 amplifies an input signal according to the filtered difference signal.

Referring to FIG. 2, reference symbol $I_{or}$ denotes BS transmission power, reference symbol $\hat{I}_o$ denotes the power level of a received signal controlled by the AGC 10, and reference symbol $\hat{I}_{or}$ denotes BS transmission power measured at the receiver according to the change of the received signal power level $\hat{I}_o$. The BS transmission power is $P_{max}$ during a packet transmission period, while it is reduced to $P_{normal}$ during a non-packet transmission period. On the other hand, the received signal power $\hat{I}_o$ is not maintained constant in the AGC 10 due to a great change in the transmission power at a point A where packet data transmission starts or at a point B where the packet data transmission is discontinued.

SUMMARY OF THE INVENTION

It is, therefore, an object of the present invention to provide an apparatus and method for maintaining a constant received signal power during a packet data transmission period in a high-speed packet transmitting mobile communication system.

It is another object of the present invention to provide an apparatus and method for preventing degradation of reception quality caused by discontinuous packet data transmission in a high-speed packet transmitting mobile communication system.

It is a further object of the present invention to provide an apparatus and method for compensating for a change in the received signal power in a high-speed packet transmitting mobile communication system.

It is still another object of the present invention to provide an apparatus and method for compensating for the change in received signal power without modifying a receiver configuration in a high-speed packet transmitting mobile communication system.

The above objects are substantially accomplished by an apparatus and method for transmitting packet data in a high-speed packet transmitting mobile communication system. In the packet data transmitting apparatus, a packet data channel generator processes packet data to be transmitted on a packet data channel, a preamble signal generator transmits a preamble signal according to a gain of the packet data channel, a select signal generator generates a select signal to transmit the preamble signal a predetermined time before transmitting the packet data, and a multiplexer outputs the preamble signal upon receipt of the select signal and the packet data in time division when the select signal is not received.

A controller is further provided to generate a packet enable signal one slot before transmitting the packet data and provide the packet enable signal to the select signal generator, upon request of transmission of the packet data.

The select signal generator, when receiving a slot boundary reference signal and the packet enable signal, generates the select signal with a time delay of the difference between the chip number of one slot counted from reception of the packet enable signal and the number of chips of the preamble signal.

In the packet data transmitting method, upon generation of new packet data, information about the transmission time and duration of previous packet data is stored and the transmission time and duration of the new packet data is calculated. If the transmission time of the new packet data does not overlap with the previous packet data duration, a preamble signal is transmitted a predetermined time before the transmission time of the new packet data, and then the new packet data is transmitted on a packet data channel. If the transmission time of the new packet data overlaps with the previous packet data duration, the preamble signal is not transmitted.

To prevent reception quality from being degraded due to a rapid transmission power change at the start of packet data transmission to mobile stations in a transmitter of a base station, upon generation of new packet data, it is determined whether the new packet data is successive to the previous packet data. If the new packet data is not successive to the previous packet data, a preamble is transmitted with maximum available power or gradually increased maximum available power for a predetermined time before transmitting the new packet data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Embodiments of the present invention will be described herein below with reference to the accompanying drawings. Also, well-known functions or configurations have been omitted for conciseness.

The present invention will be described in the context of a forward link in a high-speed packet transmitting mobile communication system that supports multimedia service including voice and data services using a 1× CDMA (Code Division Multiple Access) bandwidth. The 1×CDMA bandwidth is a 1.25-MHz bandwidth used in the traditional IS-95 North America synchronous system.

Figure 1:
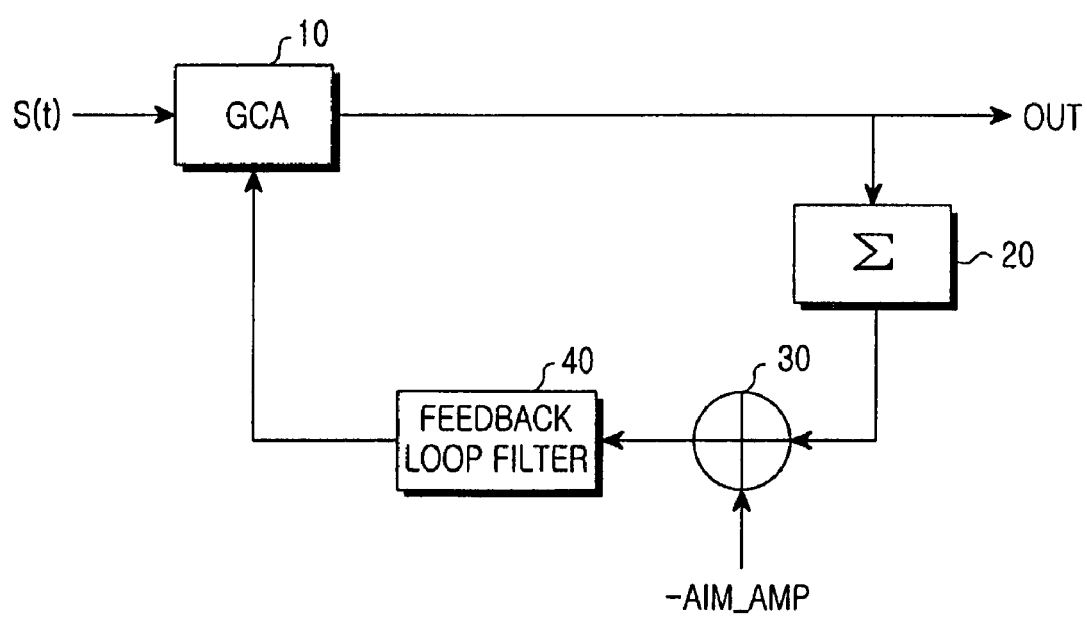
FIG. 1 is a block diagram of a conventional AGC for maintaining a constant received signal power.
Figure 2:
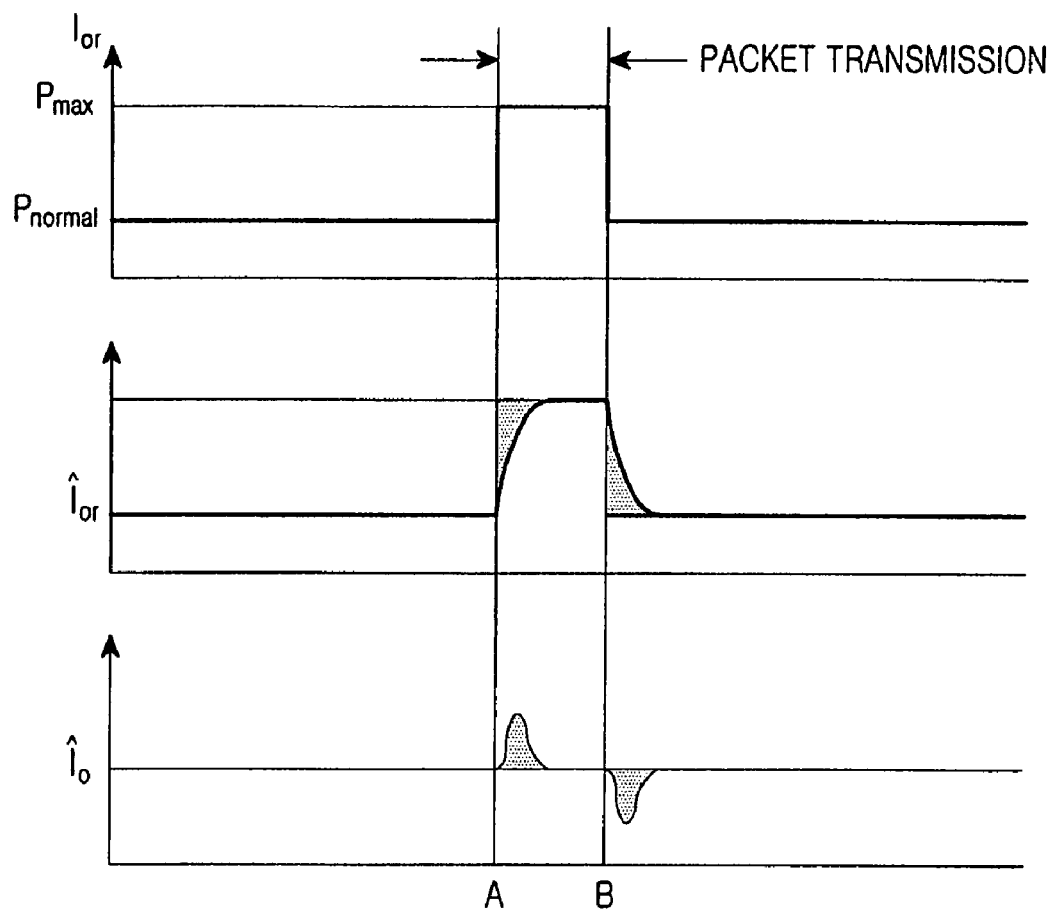
FIG. 2 is a timing diagram illustrating transmission power variations in a transmitter and received signal power variations in a receiver when a packet data channel is discontinuously transmitted.
Figure 3:
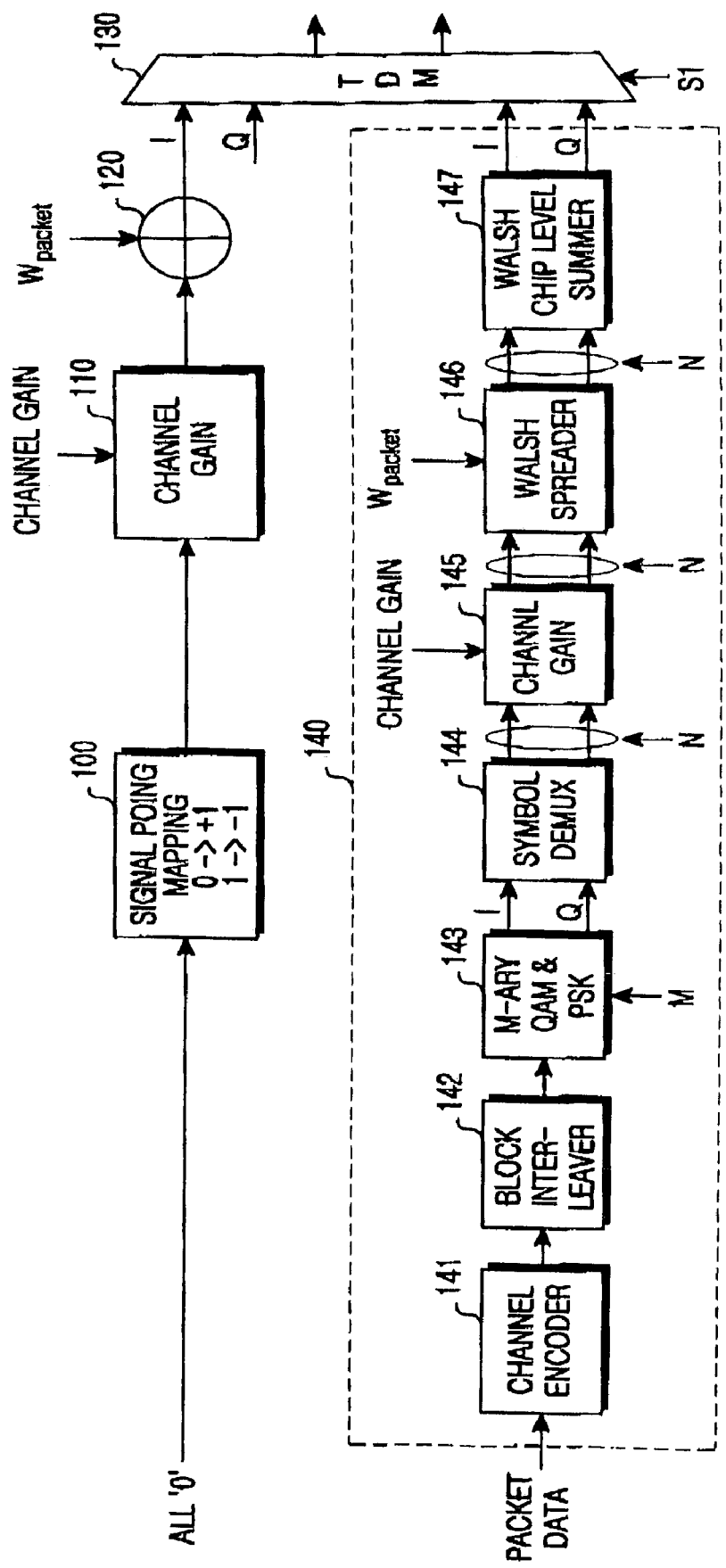
FIG. 3 is a block diagram illustrating an example of a forward common packet data channel transmitter in a BS according to an embodiment of the present invention.

FIG. 3 is a block diagram illustrating an example of a forward common packet data channel transmitter according to an embodiment of the present invention.

Referring to FIG. 3, a preamble for a forward common packet data channel is used for an AGC in a receiver to compensate for a power change in the packet data channel when the packet data channel is transitioned from an idle state to an active state. The idle state is defined as a state where no packets are delivered on the packet data channel and the active state is defined as a state where packets are delivered on the packet data channel.

The preamble comprises all 0s. A signal mapper 100 converts the 0 symbols of the preamble to +1s. A channel gain block 110 multiplies substantially the same channel gain used for the packet data channel by the output of the signal mapper 100. A spreader 120 spreads the preamble with one of the Walsh codes assigned to the packet data channel.

A packet data channel generator 140 processes packet data destined for an MS. A channel encoder 141 encodes the packet data and a block interleaver 142 interleaves the code symbols. A modulator 143 performs I/Q symbol mapping in a predetermined modulation scheme. A symbol demultiplexer (DEMUX) 144 demultiplexes the modulated symbols into N channels according to the number of available Walsh codes. A channel gain block 145 multiplies each of the N-channel symbols by a 1/Nth of the channel gain applied to the preamble. A Walsh spreader 146 orthogonally spreads the N channels with corresponding Walsh codes. A Walsh chip level summer 147 sums the spread symbols.

A multiplexer (MUX) 130 selectively outputs the preamble received from the spreader 120 or the packet data channel received from the Walsh chip level summer 147 according to a select signal S1 received from a select signal generator (not shown).

Figure 4:
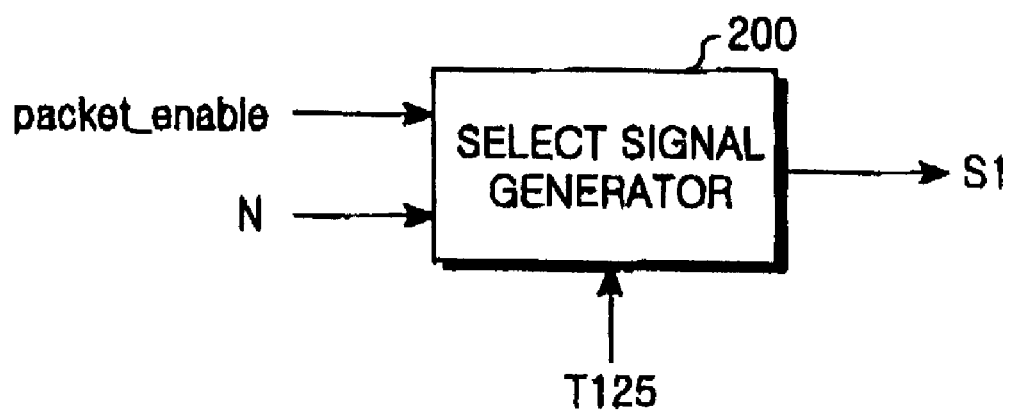
FIG. 4 is a block diagram illustrating an example of a select signal (S1) generator according to an embodiment of the present invention.

FIG. 4 is a block diagram illustrating an example of a select signal (S1) generator according to an embodiment of the present invention. Referring to FIG. 4, the selector signal generator 200 receives from a controller (not shown) a packet enable signal (packet_enable) and information indicating the number N of chips in which the preamble is to be transmitted, and a slot boundary reference signal T125. In accordance with an embodiment of the present invention, one slot is at or about 1.25 ms in duration. Upon generation of packet data for transmission, the controller sets packet_enable to 1 one slot before the packet is transmitted and resets packet_enable to 0 when the packet transmission is completed.

If packet_enable is set to 1, the select signal generator 200 outputs a select signal of 1 for N chips, M chips later. M is the difference between the slot duration in chips and N.

Figure 5:
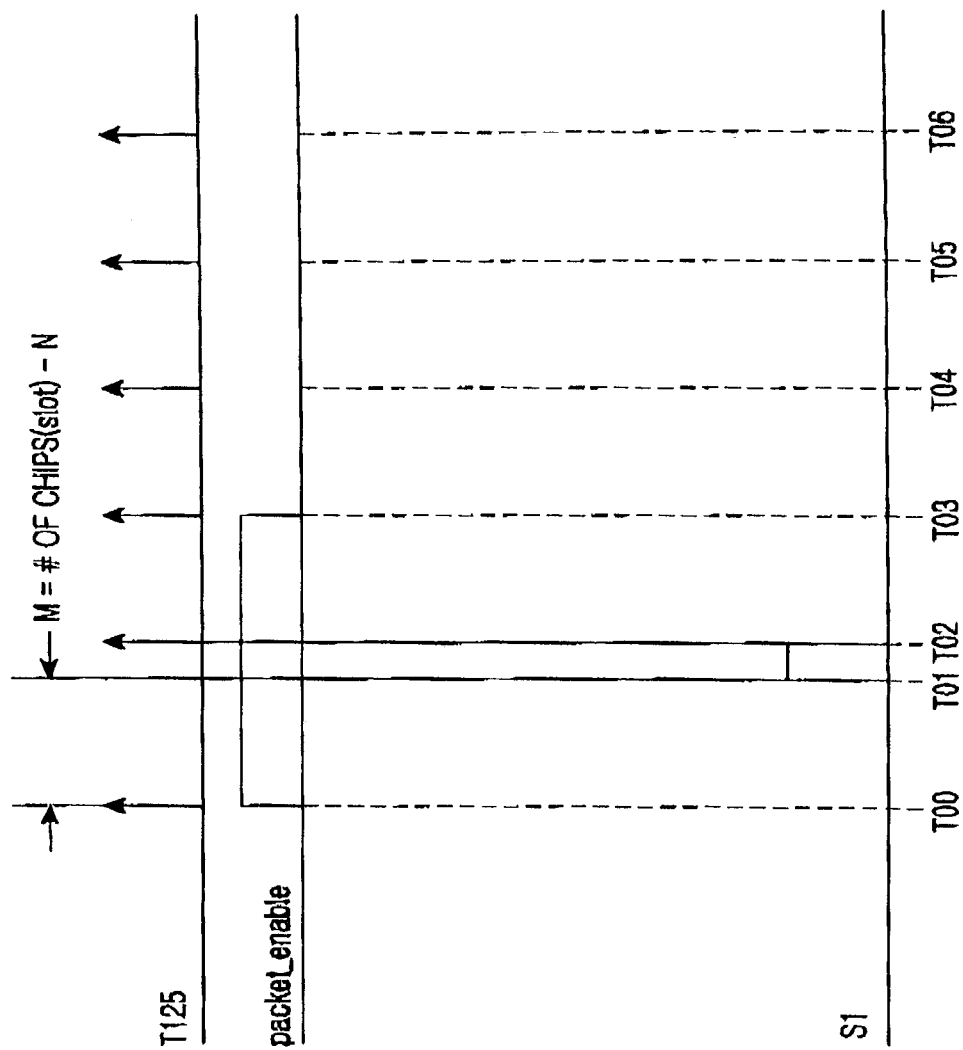
FIG. 5 is a timing diagram illustrating an example of the timing for generating a select signal in the select signal generator with respect to the timing of other related signals according to an embodiment of the present invention.

FIG. 5 is a timing diagram illustrating an example of the timing for generating a select signal S1 in the select signal generator with respect to the timing of other related signals according to an embodiment of the present invention.

Referring to FIG. 5, the reference signal T125 is generated at or about every 1.25 ms. Thus, reference numerals T00, T02, T03, T04, T05 and T06 denote time points when the reference signal T125 is generated. If packet transmission starts at T02, packet_enable is set to 1 at time T00, that is, one slot before time T02 and reset to 0 at time T03 when the packet transmission is completed. Upon receipt of packet_enable set to 1, the select signal generator 200 outputs a select signal of 1 for N chips, that is, from T01 to T02 and a select signal of 0 when the packet transmission starts. In this manner, the select signal generator 200 generates the select signal S1 and provides it to the MUX 300 of FIG. 3.

Figure 6:
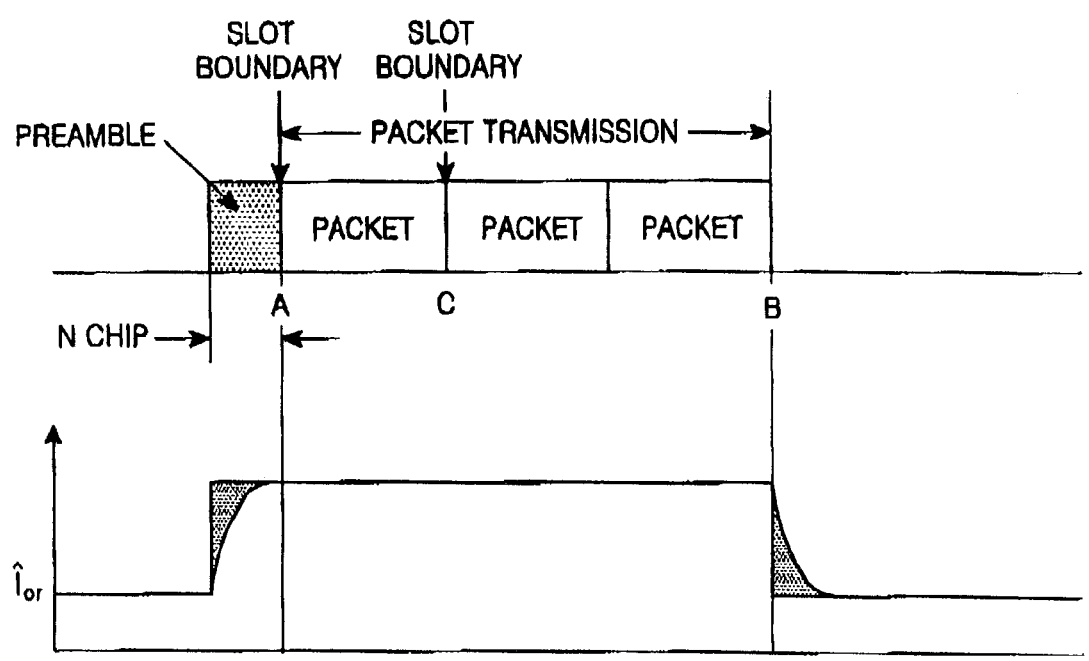
FIG. 6 is a timing diagram illustrating an example of signal timing when a preamble is transmitted before packet data according to an embodiment of the present invention.

FIG. 6 is a timing diagram illustrating an example of the signal timing when the preamble is transmitted before packet data according to an embodiment of the present invention.

Referring to FIG. 6, the packet data channel delivers packet data synchronized with a 1.25-ms slot boundary and the preamble is transmitted for N chips before the packet data transmission at time A. Upon receipt of a select signal S1, the MUX 130 transmits the preamble for N chips before the packet data channel. The same amount of power is assigned to the preamble and the packet data.

In the middle of packet data transmission at time C, the preamble is not transmitted since power has not changed at a slot boundary. The transmission of the preamble before the packet transmission enables the AGC to maintain reception power at the preamble transmission time point. As a result, the BS transmission power $\hat{I}_{or}$ is maintained constant during the packet transmission period from time A to time B.

Figure 7:
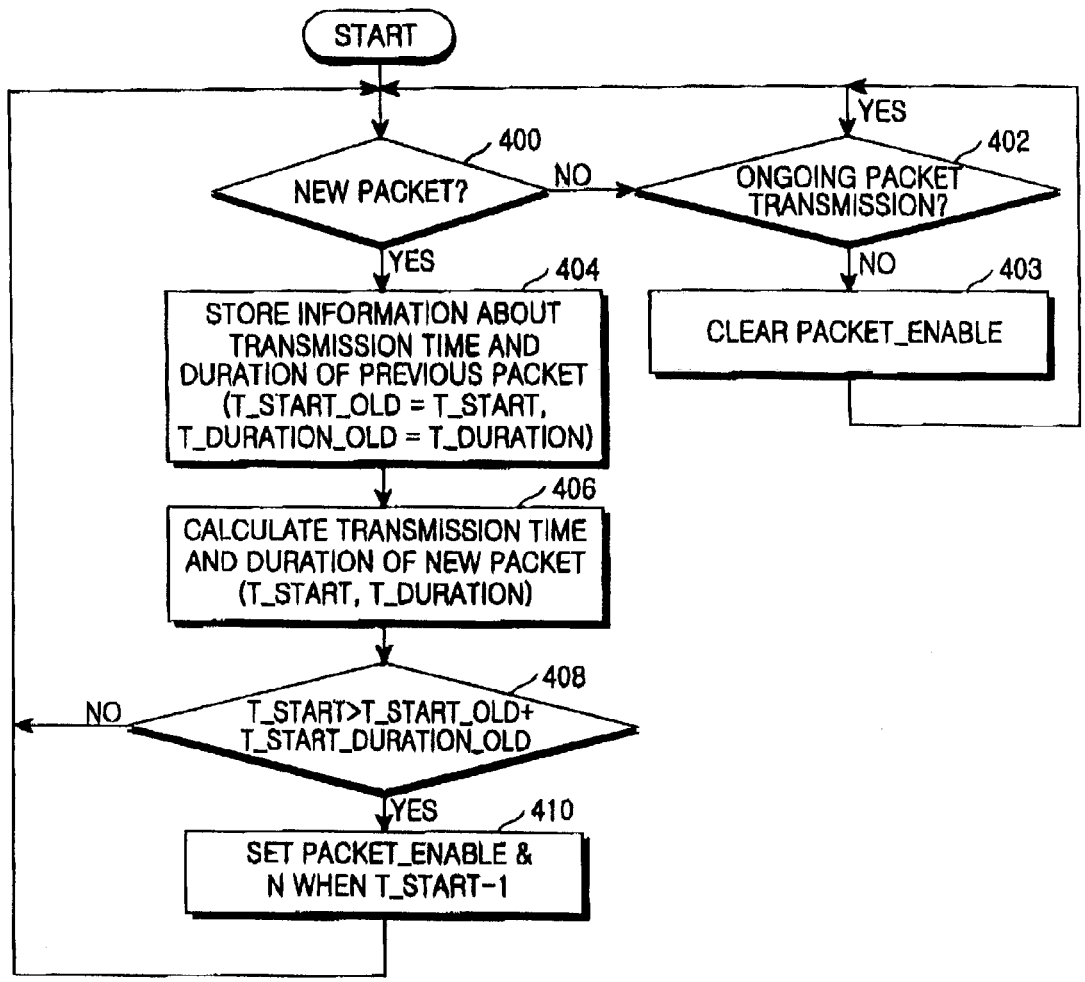
FIG. 7 is a flowchart illustrating an example of steps for providing a forward common packet data channel preamble transmission in the BS according to an embodiment of the present invention.

FIG. 7 is a flowchart illustrating an example of steps for providing a forward common packet data channel transmission in the BS according to an embodiment of the present invention.

Referring to FIG. 7, the controller determines whether a transmission packet has been generated in step 400. In the absence of a transmission packet, the controller determines whether a packet is being transmitted in step 402. If a packet is not being transmitted, the controller sets packet_enable to 0 in step 403 and returns to step 400.

Upon generation of a transmission packet in step 400, the controller stores information about the start point and duration of the previous packet in step 404 and calculates the start point and duration of the new packet in step 406. In step 408, the controller determines whether the new packet starts during the previous packet transmission period. If the packet times do not overlap, the controller proceeds to step 410 and otherwise, returns to step 400.

The reason for comparing the new packet duration and the previous packet duration is as follows. The BS is currently in either an idle state or an active state. Therefore, the new packet transmission may overlap the previous packet transmission. Referring to FIG. 6, a new packet can be generated during transmission of the previous packet from time A to time B. That is, the new packet is successive to the previous packet. If the BS is to transmit the new packet from time C to time B, the BS does not need to transmit the preamble. Thus, the BS returns to step 400.

On the other hand, if the two packet durations do not overlap in step 408, the controller sets packet_enable and N one slot before the start time of the new packet in step 410. In this procedure, the BS transmits the preamble for N chips preceding the packet transmission, as described with reference to FIG. 5.

Figure 8:
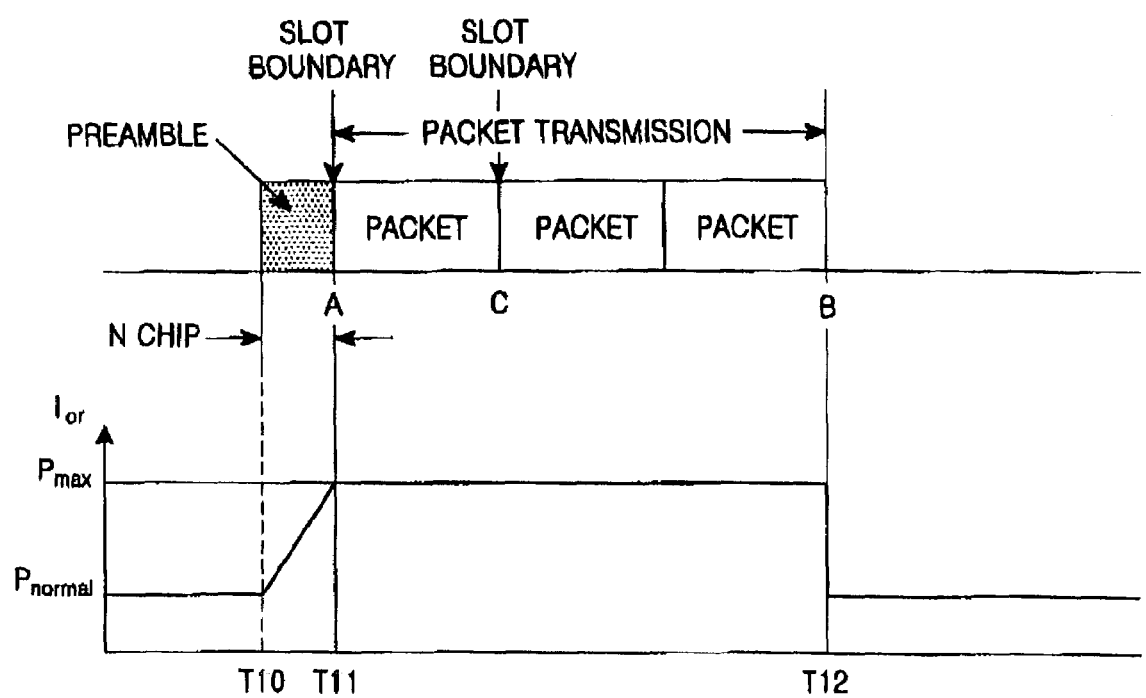
FIG. 8 is a timing diagram illustrating an example of the transmission of a preamble with gradually increased power according to another embodiment of the present invention.

FIG. 8 is a timing diagram illustrating an example of the transmission of the preamble with gradually increased power according to another embodiment of the present invention. Specifically, FIG. 8 is a timing diagram illustrating an example of the transmission of the preamble and the following packet data when the preamble is transmitted with gradually increased power.

If the preamble power is rapidly increased as illustrated in FIG. 6, the receiver may not be able to keep up with the power increase. On the contrary, the preamble power increases gradually from $P_{normal}$ to $P_{max}$ in an embodiment of the present invention. The preamble power is increased with a predetermined inclination from time T10 to time T11. The gradual preamble power increase minimizes the influence of interference in existing voice channel users when packet data is discontinuously transmitted, as compared to the preamble power increase in the first embodiment.

Figure 9:
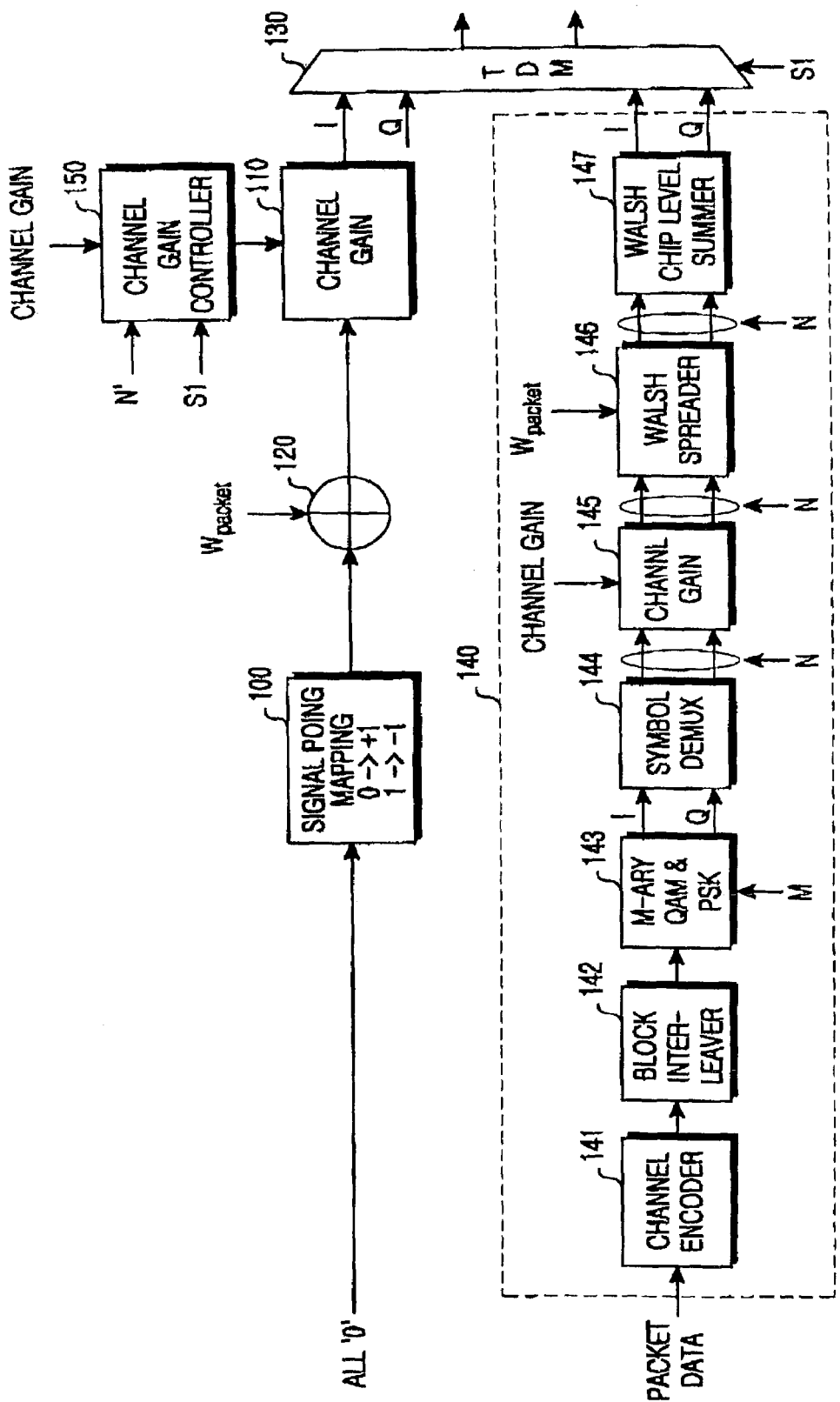
FIG. 9 is a block diagram illustrating an example of a forward common packet data channel transmitter in the BS according to another embodiment of the present invention.

FIG. 9 is a block diagram illustrating an example of a forward common packet data channel transmitter in a BS according to another embodiment of the present invention.

As compared to the configuration illustrated in FIG. 3, a channel gain controller 150 is further provided which is connected to a channel gain block 110. To make the preamble have a different gain every chip as illustrated in FIG. 8, the channel gain controller 150 applies a channel gain to the preamble after Walsh spreading is performed. The channel gain controller 150 receives information about a packet data channel gain and the number N' of spread chips in which the preamble is to be transmitted, receives a select signal S1, divides the packet data channel gain by N, and increases the channel gain of the preamble by an 1/N of the packet data channel gain per unit time while the select signal is 1.

In accordance with the present invention as described, transmission of a preamble before a forward common packet data channel prevents the degradation of reception quality of the packet data channel caused by the change of received signal power when the packet data channel is discontinuously transmitted.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of preventing reception quality from being degraded due to a rapid transmission power change at a start of packet data transmission to mobile stations in a transmitter of a base station, the method comprising the steps of:

determining, upon generation of a new packet data, whether the new packet data is successive to a previous packet data; and transmitting a preamble with maximum available power for a predetermined time before transmitting the new packet data, if the new packet data is not successive to a previous packet data;

wherein if the new packet data is not successive to the previous packet data, the base station transmits a preamble for a predetermined time period before transmitting the new packet data in order to compensate for power consumption in a packet data channel.

2. The method of claim 1, further comprising the step of not transmitting the preamble if the new packet data is successive to the previous packet data.

3. A packet data transmitting apparatus in a high-speed packet transmitting mobile communication system, comprising:

a packet data channel generator for processing packet data to be transmitted on a packet data channel;

a preamble signal generator for transmitting a preamble signal according to a gain of the packet data channel;

a select signal generator for generating a select signal to transmit the preamble signal at a predetermined time before transmitting the packet data; and a multiplexer for outputting the preamble signal upon receipt of the select signal and outputting the packet data in time division when the select signal is not received.

4. The packet data transmitting apparatus of claim 3, further comprising a controller for, upon request of transmission of the packet data, generating a packet enable signal before one slot for transmitting the packet data and providing the packet enable signal to the select signal generator.

5. The packet data transmitting apparatus of claim 3, wherein the predetermined time for which the preamble signal is transmitted is a time required for an automatic gain controller of a receiver to keep up with a power change in the packet data channel.

6. The packet data transmitting apparatus of claim 3, wherein the preamble signal is to be transmitted for a number of chips; and wherein the select signal generator, when receiving a slot boundary reference signal and a packet enable signal, generates the select signal with a time delay of the difference between a chip number of one slot counted from reception of the packet enable signal and the number of chips for which the preamble signal is to be transmitted.

7. The packet data transmitting apparatus of claim 3, further comprising a gain controller for gradually increasing the power of the preamble signal to maximum available power according to the chips of the preamble signal.

8. A packet data transmitting method in a high-speed packet transmitting mobile communication system, comprising the steps of:
storing information about a transmission time and duration of a previous packet data, upon generation of a new packet data, and calculating a transmission time and duration of the new packet data; and
transmitting a preamble signal a predetermined time before the transmission time of the new packet data if the transmission time of the new packet data does not overlap with the previous packet data duration, and transmitting the new packet data on a packet data channel.

9. The packet data transmitting method of claim 8, further comprising the step of not transmitting the preamble signal if the transmission time of the new packet data overlaps with the previous packet data duration.

10. The packet data transmitting method of claim 8, wherein the power of the preamble signal is gradually increased up to maximum available power by calculating channel gain according to the transmission period and chip number of the preamble.

11. A packet data apparatus in a high-speed packet transmitting mobile communication system, comprising:
means for storing information about the transmission time and duration of a previous packet data, upon generation of a new packet data, and calculating the transmission time and duration of the new packet data; and
means for transmitting a preamble signal at a predetermined time before the transmission time of the new packet data if the transmission time of the new packet data does not overlap with the previous packet data duration, and transmitting the new packet data on a packet data channel.

* * * * *